United States Patent [19]

Campbell et al.

[11] 4,102,701
[45] Jul. 25, 1978

[54] PLASTER COMPOSITIONS CONTAINING OXO-POLYCARBOXYLIC ACIDS AS A SET RETARDER

[75] Inventors: Colin Dennis Campbell, Cheadle; Michael Anthony Finan, Macclesfield; Kenneth William Shelton, Sale, all of England

[73] Assignee: Ciba-Geigy Corporation, Ardsley, N.Y.

[21] Appl. No.: 667,777

[22] Filed: Mar. 17, 1976

[30] Foreign Application Priority Data

Mar. 19, 1975 [GB] United Kingdom ............... 11373/75

[51] Int. Cl.² ............................................. C04B 11/14
[52] U.S. Cl. ..................................... 106/111; 106/315; 260/514 K
[58] Field of Search ............................. 106/111, 315; 260/514 K

[56] References Cited

U.S. PATENT DOCUMENTS

| | | | |
|---|---|---|---|
| 2,329,432 | 9/1943 | Bruson | 260/514 K |
| 3,598,621 | 8/1971 | Ferrara | 106/111 |

OTHER PUBLICATIONS

The American College Dictionary; Random House, New York, 1947, p. 928.

*Primary Examiner*—Winston A. Douglas
*Assistant Examiner*—John P. Sheehan
*Attorney, Agent, or Firm*—Karl F. Jorda

[57] ABSTRACT

Oxo-polycarboxylic acids act as set control agents, preferably as set retarders for plasters. Examples of usable acids are 2,2,6,6-tetra($\beta$-carboxyethyl)cyclohexanone, 2,2-di($\beta$-carboxyethyl)-3,5,5-trimethylcyclohexanone or 3-acetyl-3($\beta$-carboxyethyl)-pimelic acid. Also the salts of these acids are usable. The set control agents are added to the plaster in amounts of 5 to 5000 ppm.

17 Claims, No Drawings

PLASTER COMPOSITIONS CONTAINING OXO-POLYCARBOXYLIC ACIDS AS A SET RETARDER

The present invention relates to plaster compositions which contain an organic polycarboxylic acid which acts as a control agent for setting of plaster.

Plasters tend to harden or set fairly rapidly after mixing with water in suitable proportions. For example, calcined gypsum plaster hardens within 30 minutes after mixing with water. It is therefore desirable to increase the length of time in which the plaster slurry can be worked before it hardens. The setting process is understood to consist of the hydration of the major part of the calcium sulphate hemihydrate to the dihydrate in an aqueous slurry which results in the formation of a coherent mass by "interlocking" of the dihydrate cyrstals. By "setting time" we mean the time which elapses between the initial mixing of the calcined gypsum and water and the point when the dihydrate crystals have formed and interlocked to the stage where the plaster is no longer workable. In addition to calcium sulphate hemihydrate, plasters may contain small quantities of added lime and/or other additives.

The setting time of plaster can be measured by several methods. The exothermic reaction involved in the setting process can be monitored by means of a thermocouple or alternatively the degree of setting can be followed by the penetration of a Vicat needle or a cone as in the DIN 1168 test.

We have found that the addition of certain organic polycarboxylic acids to the plaster can control the setting of plaster compositions containing them. For example, we have found that such an addition can increase the setting time.

According to the present invention there is provided a plaster composition containing a plaster and a compound or mixture of compounds have the general formula:

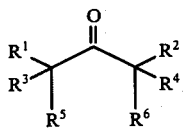

in which $R^1$, $R^2$, $R^3$ and $R^4$ can be hydrogen, $C_1$-$C_4$ alkyl or —$CH_2CH_2COOH$, $R^5$ and $R^6$ can be hydrogen, —$CH_2CH_2COOH$, or together form an polymethylene chain optionally substituted by one or more alkyl groups and containing a total of from 1 to 7 carbon atoms, provided that at least two of the groups $R^1$, $R^2$, $R^3$, $R^4$, $R^5$ and $R^6$ are —$CH_2CH_2COOH$, or salts, partial salts or mixed salts thereof with inorganic or organic bases.

Preferably the compound or compounds of the general formula I are those in which $R^1$, $R^2$, $R^3$ and $R^4$ can be hydrogen, $C_1$-$C_4$ alkyl or —$CH_2CH_2COOH$, and $R^5$ and $R^6$ together form an polymethylene chain optionally substituted by one or more alkyl groups and containing a total of from 1 to 7 carbon atoms.

The alkyl groups present as substituents on the polymethylene chain formed by $R^5$ and $R^6$ together, may contain from 1 to 6 carbon atoms provided that the alkyl substituted polymethylene chain does not contain more than 7 carbon atoms. An example of a polymethylene chain is -$CH_2CH_2CH_2$-, optionally substituted by $C_1$-$C_4$ alkyl and examples of alkyl substituents are methyl and tertiary butyl.

Examples of inorganic bases are ammonium, or alkali metal such as sodium or potassium hydroxides or carbonates, or alkaline earth metal hydroxides or carbonates such as calcium hydroxide. Examples of the organic bases are methylamine, isopropylamine, tri-n-butylamine, triethanolamine or ethylene diamine.

The plaster may comprise calcium sulphate hemihydrate which may be obtained from gypsum or from phosphogypsum and which may or may not contain small quantities of added lime. In addition the plaster may contain other set control agents which may be organic or inorganic for example tartaric acid, keratin or gypsum. If desired, the plasters may also contain other conventional additives such as dispersants, foaming agents, water-reducing agents, pigments or fillers. Commercial plasters which are typically used can be bonding coat plasters, which usually contain vermiculite but no lime, browning plasters which contain perlite filler and lime, and board finish plasters which do not contain fillers.

Compounds of formula I may be prepared by standard literature methods, but a particularly preferred procedure employs suitable starting materials having the general formula II

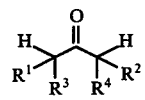

wherein $R_1$, $R_2$ are H or $C_{1-4}$ alkyl, and $R_3$, $R_4$ are H, $C_{1-4}$ alkyl, or together form a polymethylene chain optionally substituted by one or more alkyl groups and containing a total of from 1 to 7 carbon atoms.

Compounds of formula II are reacted with acrylonitrile in the absence or presence of a catalyst, such catalysts preferably being inorganic bases such as KOH, or organic bases such as triethylamine.

The intermediate nitriles thus prepared are subsequently hydrolysed with or without catalyst, preferably with a mineral acid such as HCl, or inorganic base such as NaOH, to give, after neutralisation if necessary, compounds of formula I.

Suitable starting materials of formula II are well known to those skilled in the art and may be pure compounds or mixtures. Examples of pure compounds are acetone, diethyl ketone, cyclopentanone, cyclohexanone, cycloheptanone, 4-t-butylcyclohexanone and 3,3,5-trimethylcyclohexanone. An example of a mixture is commercial methylcyclohexanone, which normally consists of a mixture of 3- and 4-methylcyclohexanone and some unsubstituted cyclohexanone.

In some instances mixtures of compounds having the formula I are formed during the preparation, and such mixtures may also be used as control agents for the setting of plaster.

It is to be also understood that where isomeric forms of compounds of general formula I exist, any isomer or mixture of isomers may be used as control agents for the setting of plaster.

Examples of compounds of formula I are as follows:

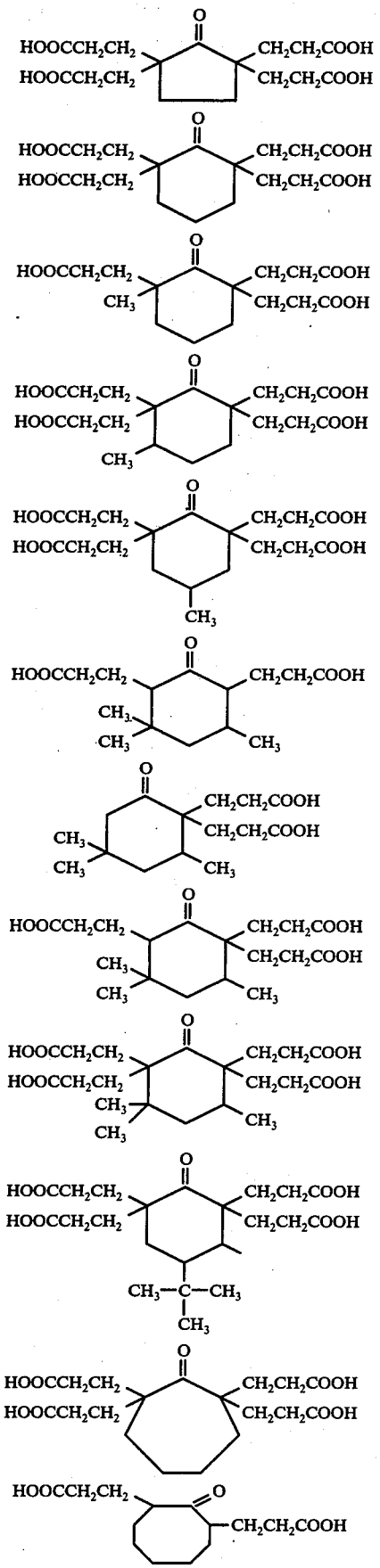

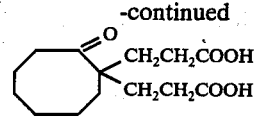

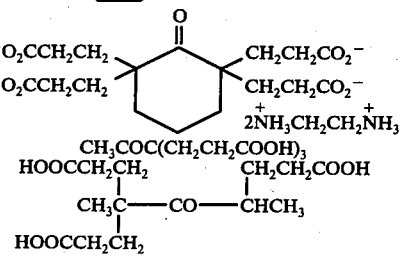

The compounds of formulae VI, XII, XIII and XVI are novel. Products prepared by the reaction of 1 mol. of 3,3,5-trimethylcyclohexanone or 1 mol equivalent of commercial methylcyclohexanone with from 2 to 4 mols of acrylonitrile, with subsequent hydrolysis of the nitrile mixture are also novel.

The amount of compound of formula I or its salts may be varied over a wide range depending on the degree of retardation required and may conveniently be from 5 to 5000 parts by weight and preferably from 25 to 1000 parts by weight per million parts by weight of plaster.

The compound of formula I or its salts may first be diluted by admixture with a non-reactive filler in the ratio of from 1:50 to 1:1 before adding to the plaster.

Alternatively the compound of formula I or its salts may be added directly to the plaster in the powder form by simple admixture, or if desired the compound of formula I or its salts may first be dissolved in water before mixing with the plaster.

In the following Examples, Examples 1 to 6 illustrate the preparation of some of the novel compounds which are useful as control agents for the setting of plaster and Examples 7 to 24 show that the compounds of formula I retard the setting time of a commercial plaster which contains no set-retarder other than the compound of formula I.

EXAMPLE 1

A solution of 4-t-butylcyclohexanone (15.4g) and crushed KOH (0.5g) in tert.butanol (62.4g) was stirred and kept at or below 30° C while acrylonitrile (21.2g) was added dropwise. During the addition a solid began to precipitate. When addition was complete the thick slurry was stirred for a further hour before the solid was collected by filtration. The solid was washed with water, then crystallised from 2-ethoxyethanol to yield 27.5g of 4-t-butyl-2,2,6,6-tetra($\beta$-cyanoethyl)cyclohexanone, m.p. 175°–178° C.

Found C, 72.16; H, 8.38; N, 15.07%

$C_{22}H_{30}N_4O$ requires: C, 72.13; H, 8.20; N, 15.30%

4-t-Butyl-2,2,6,6-tetra($\beta$-cyanoethyl)cyclohexanone(15.0g) and conc. HCl (100 ml) were heated together at 100° C for 90 min. During this time a solid was formed. After heating was complete, the mixture was cooled and the solid collected by filtration. After two recrystallisations from water the solid so obtained gave 16.9g of 4-t-butyl-2,2,6,6-tetra($\beta$-carboxyethyl)cyclohexanone m.p. 209°–212° C.

Found: C, 59.75; H, 7.54%

$C_{22}H_{34}O_9$ requires: C, 59.73; H, 7.69%

EXAMPLE 2

Using the procedure detailed in Example 1, cycloheptanone gave 2,2,7,7-tetra($\beta$-carboxyethyl)cycloheptanone as a white solid m.p. 230°–232° C.

Found: C, 57.10; H, 7.19%
$C_{19}H_{28}O_9$ requires: C, 57.00; H, 7.00%

EXAMPLE 3

Using the procedure detailed in Example 1,3-methylcyclohexanone gave 3-methyl-2,2,6,6-tetra($\beta$-carboxyethyl)cyclohexanone as a white solid m.p. 210°–213° C.

EXAMPLE 4

Using the procedure detailed in Example 1,3,3,5-trimethylcyclohexanone (14g) was reacted with acrylonitrile (21.2g) and the intermediate nitrile mixture hydrolysed using conc. HCl to give a product m.p. 190°–195° C.

EXAMPLE 5

Using the procedure detailed in Example 1, a commercial sample of methyl-cyclohexanone (11.06g) was reacted with acrylonitrile (21.2g) and the intermediate nitrile mixture hydrolysed using conc. HCl to give a product melting range 55°–110° C.

EXAMPLE 6

2,2,6,6-Tetra($\beta$-carboxyethyl)cyclohexanone (4.82g., 0.0125m) was dissolved in water (20 ml) and titrated with ethylenediamine until neutral. The amount of ethylenediamine required was 1.50g (0.025 mol). After the addition of methanol (100 ml) the mixture was left overnight. The viscous oil produced was triturated with methanol to produce a white solid m.p. 203°–4° C., the bis-ethylenediamine salt of 2,2,6,6-tetra($\beta$-carboxyethyl)cyclohexanone.

EXAMPLE 7

Samples of the compound of formula IV were dry mixed with an unlimed commercial plaster and also with a commercial plaster containing 5% added lime respectively in amounts of 500 parts per million. Two parts of the composition were thoroughly mixed with one part of water ensuring no lumps.

The setting time was estimated by following the exothermic reaction. The temperature of the mix was monitored by a thermocouple and a graph of temperature plotted against time. The setting time is taken as the midpoint of the temperature rise caused by setting. A blank was also carried out in which the setting times were also measured of the two types of plaster not containing any additive. The results are shown in the following Table I.

TABLE I

| Ex. | Concentration of Additive Parts per Mill. | Setting Time in Minutes Unlimed commercial Plaster | Commercial Plaster + Lime |
|---|---|---|---|
| 7 | 500 | 298 | 275 |
| Blank | Nil | 13 | 29 |

These results show that the setting times of plasters are significantly increased when they contain a compound of formula IV compared to plasters containing no additive.

EXAMPLES 8 to 12

A solution of the compound of formula IV containing 10,000 parts by weight per million parts by weight water was prepared. Portions of this solution, containing 1, 2, 3, 4 and 5 grams respectively were each made up to 50 grams with distilled water at room temperature.

Each 50 gram portion was added to 100 grams of commercial unlimed plaster and also to 100 grams of a commercial limed plaster containing 5% lime, respectively. The concentrations of the compound of formula IV in each type of plaster were 100, 200, 300, 400 and 500 ppm.

The setting times were estimated by the method described in Example 7 and a blank was also measured of the two types of plaster not containing any additive. The results are shown in Table II.

TABLE II

| Ex. | Concentration of Additive Parts per Mill. | Setting Time in Minutes Commmercial Unlimed Plaster | Commercial Limed Plaster |
|---|---|---|---|
| 8 | 100 | 100 | 68 |
| 9 | 200 | 145 | 115 |
| 10 | 300 | 213 | 176 |
| 11 | 400 | 290 | 235 |
| 12 | 500 | 349 | 288 |
| Blank | Nil | 13 | 29 |

These results again demonstrate that the setting times of plasters are significantly increased when they contain a compound of formula IV compared to plasters containing no additive.

EXAMPLES 13–23

The setting times of further samples of unlimed commercial plaster and commercial plaster containing 5% added lime, each containing 500 ppm of one of the compounds of formula III, V, VI, VII, XII, XIII, XVI, XVII, XVIII, the product from Example 4 and the product from Example 5, were determined using the method described in Examples 8 – 12. The results are shown in Table III.

TABLE III

| Ex. | Compound | Setting Time (mins) Unlimed Comm. Plaster | Commercial Plaster + Lime |
|---|---|---|---|
| 13 | III | 168 | 95 |
| 14 | V | 320 | 180 |
| 15 | VI | 500 | 350 |
| 16 | VII | >380 | >350 |
| 17 | XII | 200 | 130 |
| 18 | XIII | 160 | 68 |
| 19 | XVI | 318 | 272 |
| 20 | XVII | 75 | 32 |
| 21 | XVIII | 100 | 35 |
| 22 | Product from Example 4 | 44 | 10 |
| 23 | Product from Example 5 | 380 | 480 |
| Blank |  | 13 | 29 |

The results given in Examples 13–23 amply demonstrate that the setting times of plasters are significantly increased when they contain compounds of formula I, compared to plasters containing no additive.

EXAMPLE 24

Using the procedure described in Examples 8–12 and using plaster prepared from phosphogypsum instead of unlimed commercial plaster or commercial plaster containing 5% added lime, the setting time of the plaster prepared from phosphogypsum containing 2,2,6,6-tetra($\beta$-carboxyethyl) cyclohexanone was shown to be increased.

What we claim is:

1. A plaster composition comprising a plaster derived from gypsum or phosphogypsum and 5 to 5000 parts by weight per million parts by weight of plaster of a compound or mixture of compounds having the formula:

$$\begin{array}{c} O \\ R^1 \underset{R^3}{\diagup} \overset{\|}{C} \underset{R^5}{\diagdown} R^2 \\ R^6 \end{array} \quad \text{I}$$

in which $R^1$, $R^2$, $R^3$ and $R^4$ are hydrogen, $C_1$-$C_4$ alkyl or —$CH_2CH_2COOH$, $R^5$ and $R^6$ are hydrogen, —$CH_2CH_2COOH$ or together form a polymethylene chain which is unsubstituted or substituted by one or more alkyl groups and which contains a total of not more than 7 carbon atoms; provided that at least two of the groups $R^1$, $R^2$, $R^3$, $R^4$, $R^5$ and $R^6$ are —$CH_2CH_2COOH$; or the salts thereof with inorganic or organic bases.

2. A plaster composition as claimed in claim 1 in which the compound of the formula I is a compound in which $R^1$, $R^2$, $R^3$ and $R^4$ are hydrogen, $C_1$-$C_4$ alkyl or —$CH_2CH_2COOH$, and $R^5$ and $R^6$ together form a polymethylene chain which is unsubstituted or substituted by one or more alkyl groups and which contains a total of not more than 7 carbon atoms; provided that at least two of the groups $R^1$, $R^2$, $R^3$ and $R^4$ are —$CH_2CH_2COOH$; or the salts thereof with inorganic or organic bases.

3. A plaster composition as claimed in claim 2 in which the polymethylene chain is —$CH_2CH_2CH_2$—, or —$CH_2CH_2CH_2$— substituted by $C_1$-$C_4$ alkyl.

4. A plaster composition as claimed in claim 3 in which the alkyl group present on the polymethylene chain formed by $R^5$ and $R^6$ together is a methyl or tertiary butyl group.

5. A plaster composition as claimed in claim 1 wherein the compound of formula I is a salt with ammonium, sodium, potassium or calcium.

6. A plaster composition as claimed in claim 1 wherein the compound of formula I is a salt with methylamine, isopropylamine, tri-n-butylamine, triethanolamine or ethylenediamine.

7. A plaster composition as claimed in claim 1 wherein the compound of formula I is any compound having the formula III to XVIII 8. A plaster composition as claimed in claim 1 in which the compound having the formula I is prepared by reacting a compound or mixture of compounds having the formula

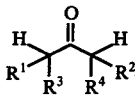

II wherein $R^1$ and $R^2$ are hydrogen or $C_{1-4}$ alkyl, and $R^3$ and $R^4$ are hydrogen or $C_{1-4}$ alkyl or together form a polymethylene chain which is unsubstituted or substituted by one or more alkyl groups and which contains a total of not more than 7 carbon atoms, with acrylonitrile in the absence or presence of a catalyst, and subsequently hydrolysing with or without catalyst.

9. A plaster composition as claimed in claim 1 in which the plaster comprises calcium sulphate hemihydrate obtained from gypsum.

10. A plaster composition as claimed in claim 1 in which the plaster comprises calcium sulphate hemihydrate obtained from phosphogypsum.

11. A plaster composition as claimed in claim 1 in which the amount of compound having the formula I or its salts is from 25 to 1000 parts by weight per million parts by weight of plaster.

12. A plaster composition as claimed in claim 1 in which the compound of formula I or its salts is first diluted by admixture with a nonreactive filler in the ratio of from 1:50 to 1:1 before adding to the plaster.

13. A plaster composition as claimed in claim 1 in which the compound of formula I or its salts is added directly to the plaster in powder form by simple admixture.

14. A plaster composition as claimed in claim 1 in which the compound of formula I or its salts is first dissolved in water before mixing with the plaster.

15. A plaster composition as claimed in claim 1 wherein said compound is 2,2,6,6-tetra (β-carboxymethyl)cyclohexanone or the salts thereof with inorganic or organic bases.

16. A plaster composition as claimed in claim 1 in which the plaster comprises calcium sulphate hemihydrate obtained from gypsum and a small quantity of lime.

17. A plaster composition as claimed in claim 1 in which the plaster comprises calcium sulphate hemihydrate obtained from phosphogypsum and a small quantity of lime.

* * * * *